United States Patent
D'Souza et al.

(10) Patent No.: US 12,176,808 B2
(45) Date of Patent: Dec. 24, 2024

(54) EMULATING CURRENT FLOWING THROUGH AN INDUCTOR DRIVEN BY A COMBINATION OF HIGH-SIDE SWITCH AND A LOW-SIDE SWITCH IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

( * ) Notice: Subject to any disclaimer, the term of this patent is extended or adjusted under 35 U.S.C. 154(b) by 232 days.

(21) Appl. No.: 18/055,839

(22) Filed: Nov. 16, 2022

(65) Prior Publication Data
US 2024/0030811 A1     Jan. 25, 2024

(30) Foreign Application Priority Data

Jul. 25, 2022  (IN) .............................. 202241042518

(51) Int. Cl.
 *H02M 1/00*     (2007.01)
 *H02M 3/07*     (2006.01)
(52) U.S. Cl.
 CPC ........... *H02M 3/07* (2013.01); *H02M 1/0009* (2021.05)
(58) Field of Classification Search
 CPC ..... G05F 1/00; G05F 1/10; G05F 1/12; G05F 1/46; G05F 1/455; G05F 1/45;
(Continued)

(56) References Cited

U.S. PATENT DOCUMENTS 6,166,528 A  12/2000  Rossetti et al.
8,129,972 B2  3/2012  Audy
(Continued)

FOREIGN PATENT DOCUMENTS

CN   102044972 A   5/2011
CN   102498653 A   6/2012
(Continued)

OTHER PUBLICATIONS

Jinwen Xiao, et al., Architecture and IC Implementation of a Digital VRM Controller, IEEE Transactions on Power Electronics, Jan. 1, 2003, 10 pages, University of California, Berkeley.
(Continued)

*Primary Examiner* — Thienvu V Tran
*Assistant Examiner* — Nusrat Quddus
(74) *Attorney, Agent, or Firm* — IPHORIZONS PLLC; Narendra Reddy Thappeta

(57) ABSTRACT

A high-side switch and a low-side switch respectively drive the inductor in a first phase and a second phase periodically. The inductor current during a longer phase of the first phase and the second phase is measured as a first portion. Peak of the inductor current at a transition from the shorter phase to the longer phase is estimated. The estimating includes comparing an estimated magnitude with a first magnitude of the inductor current at the transition in a first period, and changing the estimated magnitude. The comparing and changing are repeated until the estimated magnitude equals the first magnitude to identify the peak. A second portion of the inductor current during the shorter phase is generated based on the estimated magnitude. The first and second portions are provided as an emulated current of the inductor current.

20 Claims, 6 Drawing Sheets

(58) Field of Classification Search
CPC ... G05F 1/445; G05F 1/66; G05F 1/40; G05F
1/42; G05F 1/44; G05F 1/462; G05F
1/52; G05F 1/56; G05F 3/10; G05F 3/16;
G05F 3/18; G05F 3/185; G05F 3/20;
G05F 3/26; G05F 3/30; G05F 3/205;
G05F 3/22; G05F 3/24; G05F 3/222;
G05F 3/242; G05F 3/225; G05F 3/227;
G05F 3/245; G05F 3/247; G05F 3/262;
G05F 3/265; G05F 3/267; G05F 1/575;
H02M 5/2573; H02M 1/081; H02M
5/293; H02M 7/12; H02M 3/10; H02M
3/125; H02M 3/13; H02M 3/135; H02M
3/145; H02M 3/15; H02M 3/155; H02M
3/156; H02M 3/158; H02M 3/1588;
H02M 2003/1566; H02M 3/1582; H02M
2003/1557; H02M 3/1584; H02M 3/285;
H02M 3/33561; H02M 7/49; H02M
1/045; H02M 7/006; H02M 7/06; H02M
7/068; H02M 7/153; H02M 7/10; H02M
1/088; H02M 7/103; H02M 7/106; H02M
7/19; H02M 7/08; H02M 7/17; H02M
2001/007; H02M 7/493; H02M 7/53806;
H02M 7/5381; H02M 7/483; H02M
7/217; H02M 7/538466; H02M 7/5387;
H02M 7/53871; H02M 7/53873; H02M
7/53875; H02M 1/084; H02M 1/0845;
H02M 3/07; H02M 3/073; H02M
2003/071; H02M 2003/072; H02M
2003/075; H02M 2003/076; H02M
2003/077; H02M 2003/078; H02M
2001/0048; H02M 1/32; H02M 2001/322;
H02M 2001/327; H02M 1/34; H02M
2001/342; H02M 2001/344; H02M
2001/346; H02M 2001/348; H02M 1/36;
H02M 1/38; H02M 1/42; H02M 1/4208;
H02M 1/4216; H02M 1/4225; H02M
1/4233; H02M 1/4241; H02M 1/425;
H02M 1/4258; H02M 1/4266; H02M
2001/4275; H02M 2001/4283; H02M
2001/4291; H05B 39/048; B23K 11/24;
H04B 2215/069; H02J 3/46; H02J 3/38;
G01R 19/165; G01R 19/16504; G01R
19/16509; G01R 19/16514; G01R
19/16519; G01R 19/16523; G01R
19/16528; G01R 19/16533; G01R
19/16538; G01R 19/16542; G01R
19/16547; G01R 19/16552; G01R
19/16557; G01R 19/16561; G01R
19/16566; G01R 19/16571; G01R
19/16576; G01R 19/1658; G01R
19/16585; G01R 19/1659; G01R
19/16595; G01R 19/17
See application file for complete search history.

(56) References Cited

U.S. PATENT DOCUMENTS

| | | | |
|---|---|---|---|
| 9,184,651 B2 | 11/2015 | Nguyen et al. | |
| 9,812,963 B1* | 11/2017 | Nguyen | H02M 3/1588 |
| 9,941,795 B1* | 4/2018 | Mayega | H02M 3/156 |
| 10,845,833 B1* | 11/2020 | Dietrich | H02M 3/157 |
| 2015/0077074 A1* | 3/2015 | Rahimi | H02M 3/1588 323/271 |
| 2015/0097539 A1 | 4/2015 | Ragona et al. | |
| 2020/0373842 A1* | 11/2020 | Chen | H02M 7/483 |
| 2021/0099080 A1 | 4/2021 | Chen | |
| 2024/0154529 A1* | 5/2024 | Feng | H02M 1/0032 |
| 2024/0250613 A1* | 7/2024 | McCue | H02M 1/32 |

FOREIGN PATENT DOCUMENTS

| | | |
|---|---|---|
| CN | 107425712 A | 12/2017 |
| CN | 108292887 A | 7/2018 |
| CN | 113922663 A | 1/2022 |
| DE | 102014102447 B4 | 2/2017 |
| TW | 202211609 A | 3/2022 |

OTHER PUBLICATIONS

LM3495 Emulated Peak Current Mode Buck Controller for Low Output Voltage, Apr. 2013, 39 pages, Dallas, Texas.
Venkatesh Burli, An Inductor Emulator Approach to Peak Current Mode Control in a 4-Phase Buck Regulator, Thesis, Nov. 2017, 79 pages, Arizona State University.
Marecar Hadja, High Performance Control of VRM Circuits, Thesis, Dec. 20, 2006, 192 pages, National University of Singapore.
Carmen Parisi, Multiphase Buck Design From Start to Finish (Part 1), Apr. 2021, 19 pages, Dallas, Texas.
PWM Doubler with Output Monitoring Feature, Jun. 9, 2017, 16 pages.
Bar Halivni, Enhanced processing and conversion Capabilities in multi-modular energy Management systems, Oct. 2019, Ben-Gurion University of the Negev.
International Search Report dated Jan. 9, 2024, for PCT Application No. PCT/IN2023/050711, filed on Jul. 25, 2023, 4 pages.
Written Opinion of the International Searching Authority dated Jan. 9, 2024, for PCT Application No. PCT/IN2023/050711, filed on Jul. 25, 2023, 3 pages.

* cited by examiner

EMULATING CURRENT FLOWING THROUGH AN INDUCTOR DRIVEN BY A COMBINATION OF HIGH-SIDE SWITCH AND A LOW-SIDE SWITCH IN A SWITCHING CONVERTER

PRIORITY CLAIM

The instant patent application is related to and claims priority from the co-pending provisional India patent application entitled, "Current Sensing High-Side Emulation Tracking", Serial No.: 202241042518, Filed: 25 Jul. 2022, which is incorporated in its entirety herewith to the extent not inconsistent with the description herein.

BACKGROUND

Technical Field

Embodiments of the present disclosure relate generally to power supply circuits, and more specifically emulating current flowing through an inductor driven by a combination of high-side switch and a low-side switch in a switching converter.

Related Art

Switching converter refers to a component which generates a regulated DC (direct current) voltage from an input supply voltage by employing one or more switches, as is well known in the relevant arts. Typically, a switching converter transforms the input supply voltage into a pulsed voltage by operating switch(es), the pulsed voltage then being smoothed using capacitors, inductors, and other elements to generate the regulated DC voltage.

Power is supplied from the input to the output by turning ON switches (e.g., MOSFETs) until the desired voltage is reached. Switching converters are used in components such as regulated power supplies, which in turn are used in devices such as computers and mobile phones, as is also well known in the relevant arts.

A switching converter often contains a pair of switches driving an inductor. Each switch is typically implemented as a transistor (e.g., MOSFET) and the switches are connected in series between input supply voltage and a reference terminal (e.g., ground). The switch coupled closer to the input voltage (source of input power to the converter) is termed as the high-side switch, while the other one is termed as a low-side switch. The switches are operated by a control circuit which switches on the transistors in successive non-overlapping time durations to cause the switch that is currently ON to drive the inductor in the corresponding duration.

There is often a need to emulate the current flowing through such an inductor. Emulation implies construction of the inductor current, and the output of emulation can be either an emulated signal which is akin to the inductor current, or a representation of the inductor current in some other suitable form such as voltage or digital values. The emulated information can then be used for various purposes as suited in the corresponding environments.

Several aspects of the present disclosure are directed to emulating current flowing through an inductor driven by a combination of high-side switch and a low-side switch in a switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, inductor current in a switching converter is emulated. A high-side switch and a low-side switch in the switching converter respectively drive the inductor in a first phase and a second phase periodically. A current emulator block in the switching converter measures (or senses) a first portion of the inductor current corresponding to a longer phase of the first phase and the second phase, the other one of the first phase and the second phase being a shorter phase. The current emulator block estimates a peak of the inductor current at a transition from the shorter phase to the longer phase. The estimating includes (a) comparing an estimated magnitude with a first magnitude of the inductor current at the transition in a first period, (b) changing the estimated magnitude, and performing (a) and (b) until the estimated magnitude equals the first magnitude to identify the peak. The current emulator block generates a second portion of the inductor current during the shorter phase of the inductor current based on the estimated magnitude, and provides the first portion and the second portion as an emulated current of the inductor current.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
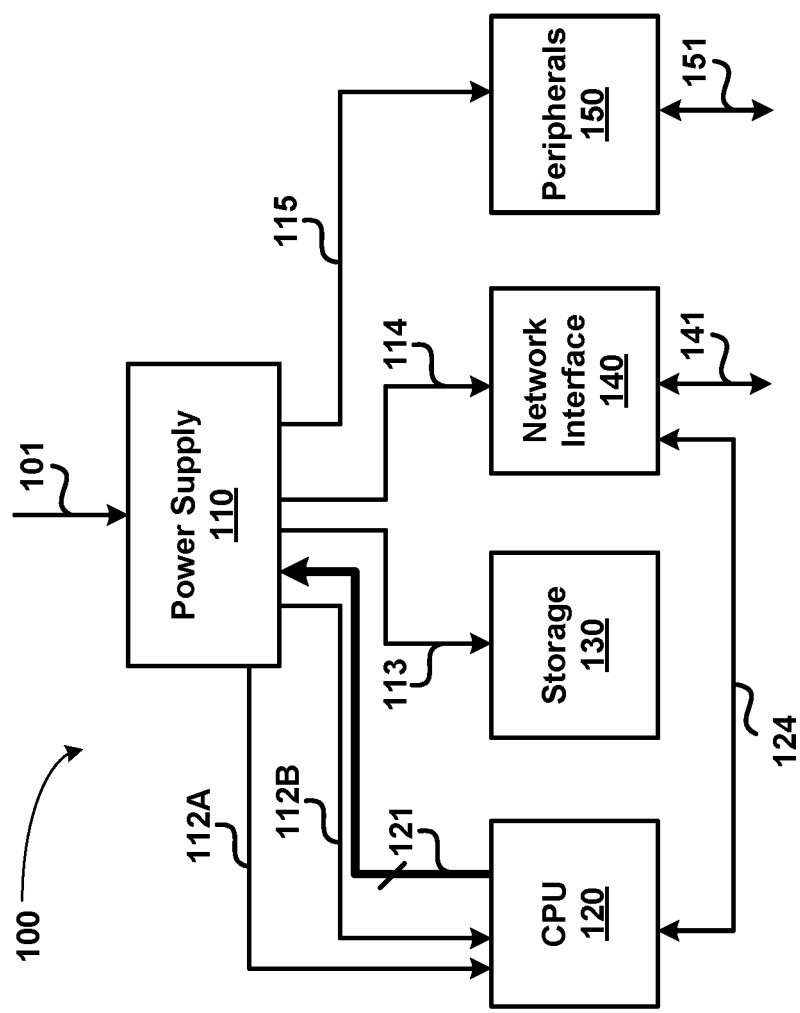
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1A

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 receives from/transmit to external systems and CPU 120 respectively on path 141 and path 124.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to control the multi-phase converters to reduce/increase current output based on the specific signal (e.g., PS1, PS2 and PS3).

In the embodiment, power supply 110 is a voltage regulator module (VRM), sometimes also called processor power module (PPM), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2A.

3. Voltage Regulator Module

Figure 2A:
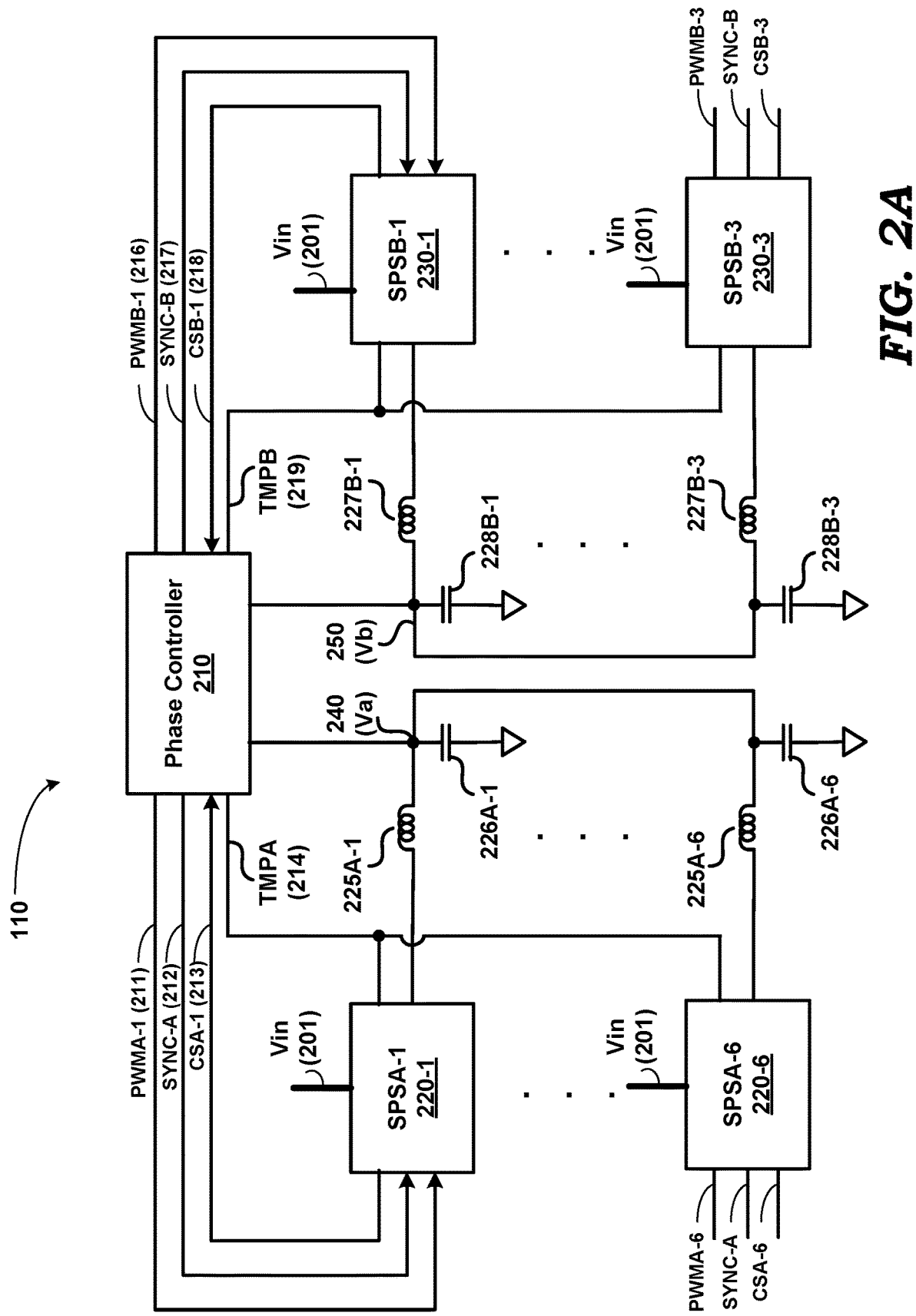
FIG. 2A is a block diagram illustrating the details of a voltage regulator module (VRM) in an embodiment of the present disclosure.

FIG. 2A is a block diagram illustrating the details of a VRM in an embodiment of the present disclosure. Power Supply 110 is implemented as a Voltage Regulator Module and is shown containing phase controller 210, smart power stage (SPS) SPSA-1 (220-1) through SPSA-6 (220-6), SPSB-1 (230-1) through SPSB-3 (230-3), inductors 225A-1 through 225A-6, and 227B-1 through 227B-3 and capacitors 226A-1 through 226A-6, and 228B-1 through 228B-3. Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/Paths 240 and 250 can correspond to paths 112A and 112B of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 form a single buck converter, and one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

Each SPS may be implemented to contain a high-side switch, a low-side switch, gate-drive circuitry for the two switches, a temperature monitor circuit and an inductor-current sense (or emulation) circuit to provide information indicating the magnitude of inductor current to phase controller 210. The current supplied by an SPS, and therefore the corresponding inductor current waveform generally depends on the load current drawn from the supply voltage, although the high-side switch and low-side switch of an SPS may be viewed as 'driving' the inductor. Each SPS receives a source of power as an input which is connected to the high-side switch (shown in detail in sections below). In FIG. 2A, the supply source is numbered 201, and has a voltage Vin. Typical value of Vin in a VRM is about 21 volts (V).

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and provides a pulse-width modulated (PWM) signal, which may, for example, be a binary signal of fixed frequency. The PWM signal controls the opening and closing of high-side switch and low-side switch of the phase. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same converter are staggered, i.e., delayed with respect to each other in phase such that typically no two high-side switches or low-side switches in the converter (i.e., respective SPSes) will be overlapping. Such a technique is employed for reasons such as, for example, to ensure that the peak instantaneous current drawing from Vin is relatively low (or zero) at all times.

Signal TMP is an output from an SPS to phase controller 210, an provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210. The maximum of the TMP outputs of a phase is driven on the wired connection.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSes of the same converter share a single SYNC signal.

Signal CS (current sense) is an input to phase controller 210 from an SPS, and contains information regarding the magnitude of the inductor current of that phase. The information can be in the form of a current, voltage, digital values, etc.

Figure 2B:
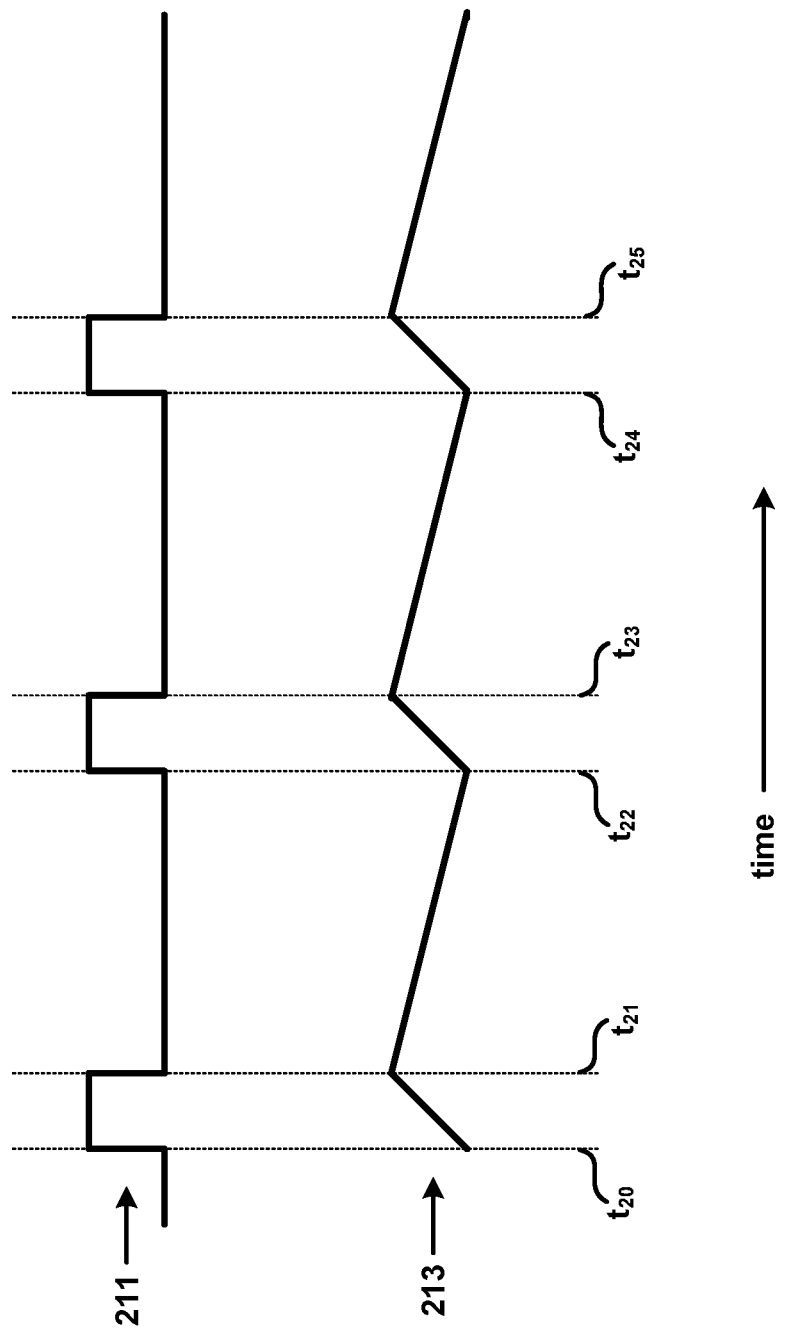
FIG. 2B is a diagram illustrating example waveforms of a pulse-width modulated (PWM) signal to a smart power stage (SPS) and the inductor-current.

FIG. 2B illustrates a PWM signal to an SPS and the inductor-current information CS in an example. For ease of understanding, the SPS is assumed to be SPSA-1. Signal 211 represents the PWM signal PWMA-1, and signal 213 represents CS signal CSA-1 generated by SPSA-1. PWMA-1 is shown as being at logic high level in time intervals t20-t21, t22-t23 and t24-t25, and logic low level in intervals t21-t22 and t23-t24. A logic high level of PWMA-1 causes the high-side switch and the low-side switch in SPSA-1 to be respectively closed and open. A logic low level of PWMA-1 causes the high-side switch and the low-side switch in SPSA-1 to be respectively open and closed. Intervals in which PWMA-1 is a logic high may be viewed as a 'first phase', and intervals in which PWMA-1 is a logic low may be viewed as a 'second phase'. The first and second phases repeat, as may be observed from FIG. 2B, and are thus periodic. The high-side switch and the low-side switch may be viewed as respectively 'driving' the inductor in each of the first phases and second phases periodically. It is noted that the terms 'first phase' and 'second phase' are not to be confused with the phases of a multi-phase converter (as noted above).

CSA-1 213 represents the current flowing through inductor 225A-1. CSA-1 can be a replica current, voltage and digital values (assuming SPSA-1 has the circuitry to generate such digital values), as examples. In the example of FIG. 2A, CSA-1 is a current and may be a scaled replica of the current through inductor 225A-1. In the first phases (such as t20-t21), CSA-1 rises linearly, and in the second phases (such as t21-t22) CSA-1 falls linearly, just as the inductor-current would.

The other SPSes may also have similar waveforms at the corresponding connections to phase controller 210.

As noted above, each SPS provides its CS signal to phase controller 210 to enable phase controller 210 to perform various operations such as current-mode control of voltage regulation, current limiting, short circuit protection, and balancing the currents generated by each SPS of a buck converter so as to make the currents from each SPS of a converter to be substantially equal in magnitude. Accordingly, the implementation details of an SPS in an embodiment of the present disclosure is described next.

4. Smart Power Stage (SPS)

Figure 3:
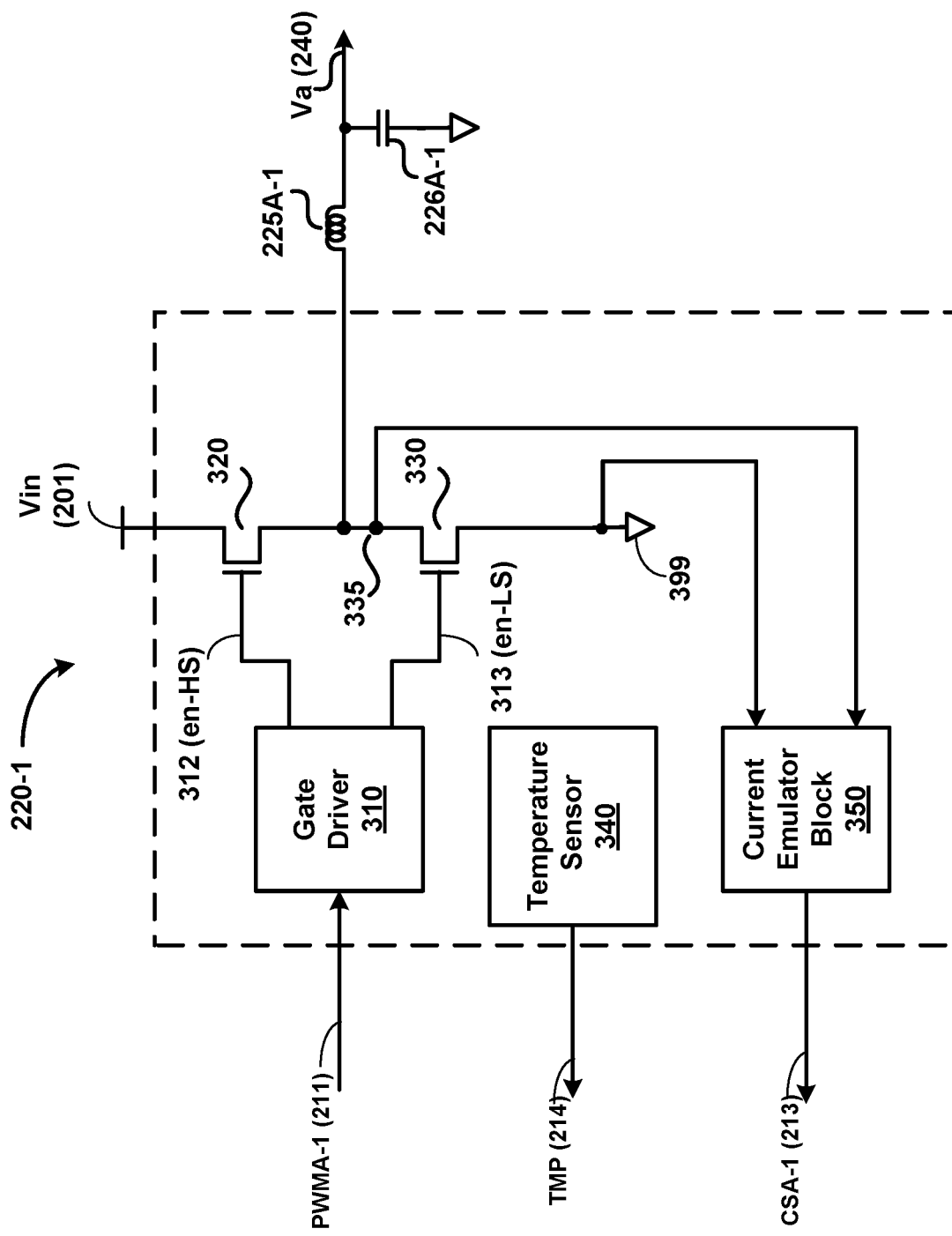
FIG. 3 is a diagram illustrating the implementation of an SPS in an embodiment of the present disclosure.

FIG. 3 is a diagram illustrating the implementation of an SPS in an embodiment of the present disclosure. SPSA-1 (220-1) is shown in detail in FIG. 3. The other SPSes can also be implemented to be similar to SPSA-1. However, in other embodiments, an SPS can have more or fewer blocks. SPSA-1 is shown containing gate driver 310, high-side (HS) switch 320, low-side (LS) switch 330, temperature sensor 340 and current emulator block 350. Also shown in FIG. 3 are inductor 225A-1 and capacitor 226A-1. Node 240 provides the supply voltage Va.

Temperature sensor 340 measures the ambient temperature at SPS 220-1 periodically, and provides the temperature values on path 214.

Gate driver 310 receives binary signal PWMA-1, and in response to the logic level of PWMA-1 generates the appropriate voltage to turn ON and turn OFF HS switch 320 and LS switch 330 in corresponding intervals indicated by PWMA-1. HS switch 320 and LS switch 330 are each shown implemented as a MOSFET (Metal Oxide Semiconductor Field Effect Transistor) with gate driver 310 driving the gate terminals of the MOSFETs, although other implementations for the switches are possible. In the example of FIG. 3, when PWMA-1 is a logic high (corresponding to the first phase), gate driver 310 generates respective appropriate voltages on paths 312 (en-HS) and 313 (en-LS) to switch ON MOSFET 320 and switch OFF MOSFET 330. When PWMA-1 is a logic low (corresponding to the second phase), gate driver 310 generates respective appropriate voltages on paths 312 and 313 to switch OFF MOSFET 320 and switch ON MOSFET 330.

As shown in FIG. 2B, when PWMA-1 is logic high, current flows from Vin to the load (connected to Va node, but not shown) via HS MOSFET 320 and inductor 225A-1 with rising slope. When PWMA-1 is logic low, the inductor current flows in the loop formed by LS MOSFET 330, inductor 225A-1 and load with falling slope.

Current emulator block 350 operates to construct the inductor current, and provides the constructed inductor current on path CSA-1. One problem with measuring (or sensing) the inductor current is when the duration for which a switch (HS or LS) is ON only for a very short duration. Generally, the duration for which the HS switch and LS switch are ON in the respective phases (the first and second phases noted above) depends on the difference between Vin and Va (or regulated output voltage in general). If Vin is much greater than Va (e.g., Vin equals 21V and Va is 1V), then the first phase (also termed charging phase) is of a very short duration, while the second phase (also termed discharging phase) is of a comparatively long duration.

In general, it may be difficult to measure the inductor current reasonably accurately during a very short phase, such as the first phase noted herein. On the other hand, it may be easier to measure the inductor current fairly accurately during a long phase, such as the second phase noted herein.

Current emulator block 350 operates to generate replicas of the inductor current in the first phases as well as the second phases. In the second phases, current emulator block 350 measures (and creates a replica of) inductor current. In the example of FIG. 3, current emulator block 350 receives the voltage across LS MOSFET 330 via paths 335 and 399 (ground) in the second phases. Current emulator block 350 in effect divides the measured voltage with the ON-resistance of LS MOSFET 330 to obtain the inductor current magnitude in the second phases. In other embodiments, other techniques for measuring inductor current in the second phases can be used, that are well-known in the relevant arts.

However, since the first phases are very short, current emulator block 350 does not measure the inductor current in the first phases, but operates to estimate and create a replica (scaled or otherwise) of the inductor current in the first phases.

The manner in which current emulator block 350 measures and creates a replica (scaled or otherwise) of inductor current in the second phases, and estimates and creates a replica (scaled or otherwise) of the inductor current in the first phases is described next along with the implementation details of current emulator block 350 in an embodiment.

5. Current Emulator Block and Emulating Inductor-Current

Figure 4:
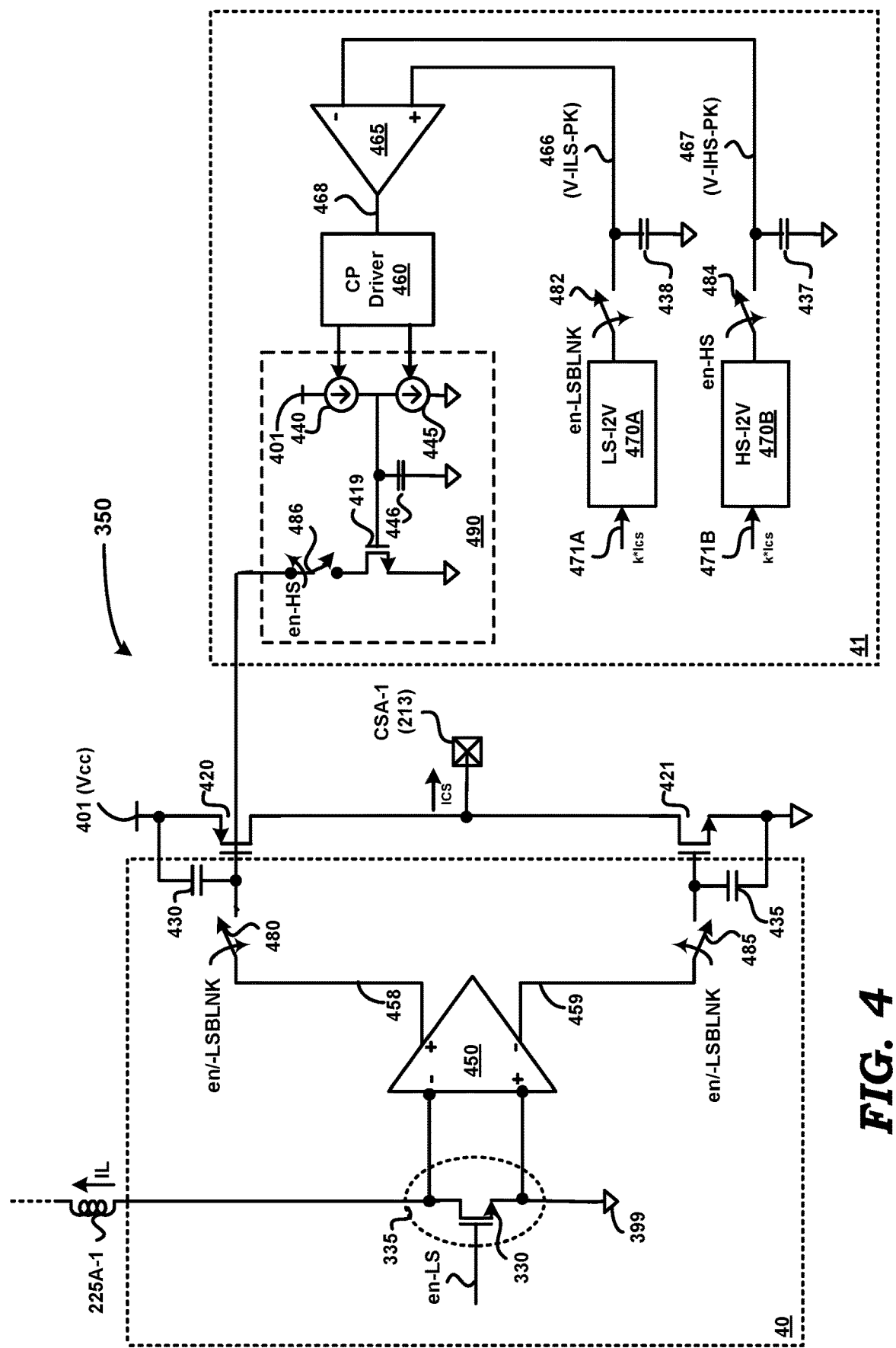
FIG. 4 is a diagram illustrating the details of a current emulator block in an embodiment of the present disclosure.

FIG. 4 is a diagram illustrating the details of a current emulator block in an embodiment of the present disclosure. Current emulator block 350 (of FIG. 3) is shown containing circuits 40 and 41. It is noted herein that the details of circuit 40 as relevant for the operation of circuit 41 (and current emulator block 350) have been provided and described. However, it is to be understood that in alternative implementations of current emulator block 350, circuit 40 may be implemented differently, and use more components and circuitry.

Circuit 40 measures (or senses, rather than estimating) the inductor current IL (inductor 225A-1 of FIG. 2 is also shown for clarity) in the second phases (i.e., when LS switch 330 (FIG. 3) is closed and driving the inductor current, HS switch 320 being open in the second phases). Circuit 40 re-creates (i.e., creates a replica of) the inductor current in the second phases. As may be observed from FIG. 2B, the inductor current in the second phases has a falling (negative slope). Current emulator block 350 provides the replica inductor current in the second phases at/on node/path CSA-1 (213), as will be described below.

Circuit 41 operates to estimate and create a replica of inductor current in the first phases, since it may be difficult to accurately measure the inductor current in the first phases accurately due to the very short duration of each of the first phases. An example of such very short duration is when the duty cycle of the PWM signal is around 5%, and the period of the PWM signal is 1.6 microseconds (us). Current emulator block 350 provides the replica inductor current in the first phases also at/on node/path CSA-1 (213), as will be described below. Thus, current emulator block 350 provides the complete inductor current information in the form of replica currents (noted above) on path CSA-1.

The series connection of transistors 420 and 421 across supply node 401 (Vcc) and ground 399 is referred to herein as "output block 495". Transistor 420 is shown as P-channel metal oxide semiconductor field effect transistors (PMOS), and transistor 421 is shown as N-channel metal oxide semiconductor field effect transistors (NMOS). Supply Vcc may be provided to SPSA-1 (as well as the other SPSes) by phase controller 210, or be generated in VRM 199 in a known way.

Circuit 40 of current emulator block 350 is shown containing amplifier 450, switches 480 and 485, and capacitors 430 and 435. For clarity, LS switch 330 is also shown, although it would typically not be part of circuit 40. Label 399 represents a ground connection.

Amplifier 450 receives the voltage across LS switch 330 in the second phases, and provides an amplified output voltage as an output. Amplifier 450 is shown as a fully differential amplifier merely as an example. Other amplifier types and topologies can also be used instead. In an embodiment, amplifier 450 is a fully differential amplifier with gain determined by a feedback network (not shown, but for examples using two pairs of resistors as is well known in the art) that would be used to operate amplifier 450 in closed-loop mode. In the embodiment, fully differential amplifier receives the voltage across LS switch 330 across the (−) input terminal connected to path 335 and the (+) input terminal connected to ground 399. Fully differential amplifier 450 provides a corresponding amplified difference as output voltage across terminals 458 (+) and 459 (−).

LS switch 330 is switched ON (and is therefore conductive) by signal 'en-LS' (313 of FIG. 3) in (and for the duration of) the second phase only. Thus, the current (IL) through inductor 225A-1 is sensed by circuit 40 by measuring/obtaining the voltage across the LS switch 330 in the second phase. For example, if the LS switch has a 2.5 milli Ohm resistance Ron and is sourcing an inductor current of 40 A, then the voltage across LS switch 330 will be 100 mV. Sensing the voltage across the LS switch 330 is a lossless method of sensing the current. However, other techniques for obtaining a measure of the magnitude of inductor current in the second phases can also be used, as would be apparent to one skilled in the arts upon reading this disclosure.

Figure 5:
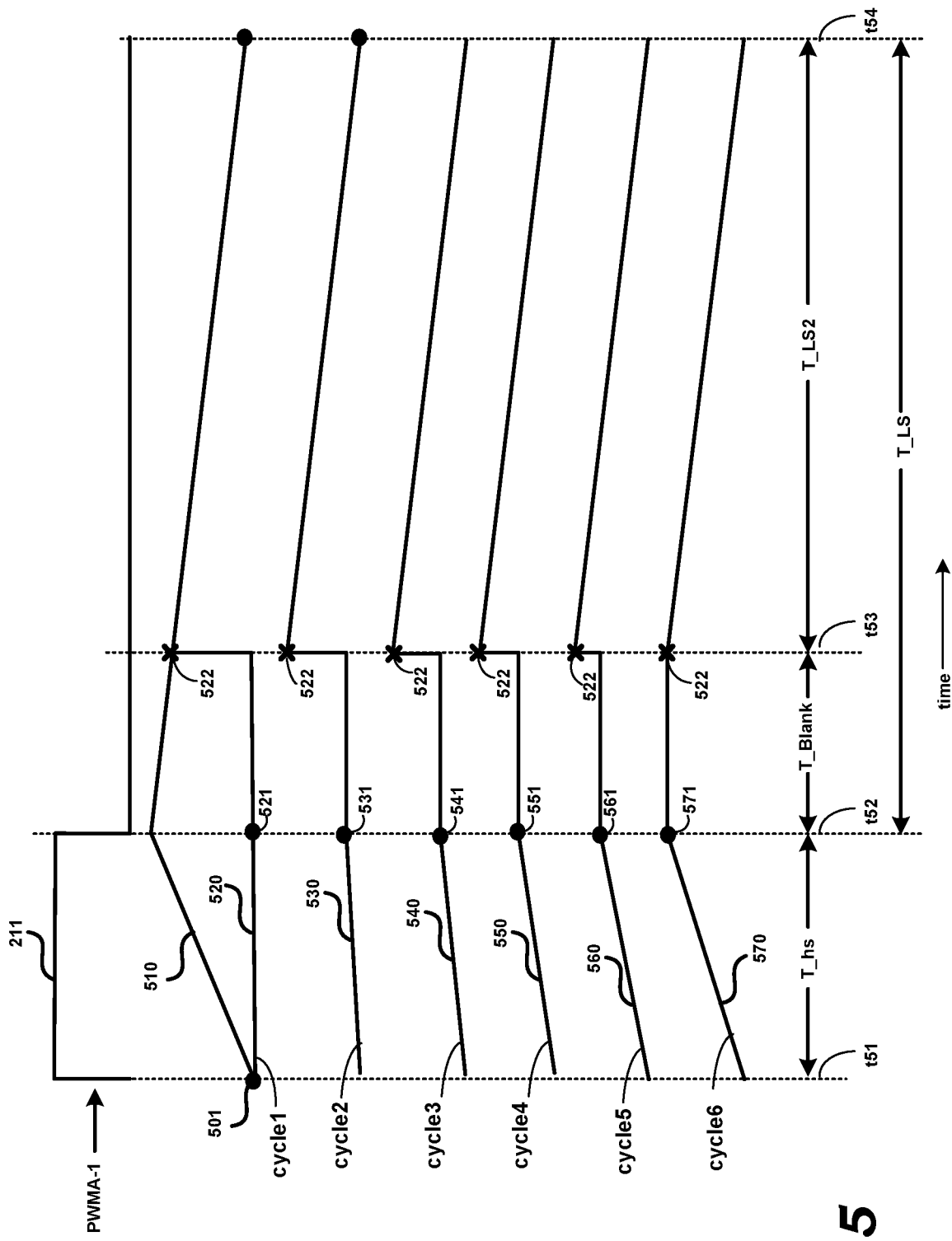
FIG. 5 is a diagram illustrating example waveforms of emulated inductor current in an embodiment of the present disclosure.

The combined operations of circuit 40 and output block 495 in the second phase is now described with combined reference to FIG. 4 and FIG. 5.

(A) Second Phase:

In operation, LS switch 330 is switched ON by control input en-LS (313) at the start of the second phase (e.g., time instants t21, t23 and t25 in FIG. 2B, and also t52 in FIG. 5). It is noted that in the interest of simplicity, the blanking interval (T-LSBLNK) (t52-t53) of FIG. 5 is not shown (or is assumed zero) in FIG. 2B. LS switch 330 is switched OFF at the start of the immediately next first phase (e.g., t22, t24 of FIG. 2B or t54 of FIG. 5). Switches 480 and 485 are closed for the duration of T-LS2 (FIG. 5) by signal en\-LSBLNK, and are open otherwise.

Control signals en\-LSBLNK and en-LSBLNK may be binary signals, and generated by a control circuit (not shown), but which may be contained in current emulator block 350. The generation of such control signals and the circuitry for such generation can be done in a known way. Control signal en\-LSBLNK is the logical inverse of en- LSBLNK. Control signal en-LSBLNK is operational (e.g., logic high) to switch-ON (i.e., close) the corresponding switch only for the interval T-LSBLNK.

It is noted here that T-LSBLNK is an interval in which amplifier 450 is ON (staring from, the start of T-LSBLNK), but whose outputs are not yet settled and correctly reflecting the input. This occurs due to the bandwidth (BW) of differential amplifier 450 being finite. Therefore, amplifier 450 may need some time from being switched ON (e.g., at the start of T-LS) till it reaches steady-state operation and generates outputs correctly. The duration of T-LSBLNK may be set by a designer/user based on the BW of differential amplifier 450. Output on CSA-1 is disabled for the duration of T-LSBLNK to prevent unsettled/transient output from being provided on it. Control signal en\-LSBLNK causes each of switches 480 and 485 to be closed at the end of the blanking phase, and to be opened at the end of the corresponding second phase, the switches remaining closed for the duration from the end of the blanking phase to the end of the corresponding second phase.

Therefore, in the second phase, voltage 458 and 459 respectively cause transistors 420 and 421 to source and sink respective currents based on the specific magnitudes of voltages 458 and 459 and therefore the input voltage to the amplifier. Thus, output block 495 effectively operates as a voltage to current converter. As a result, a difference current (denoted by Ics) between the current sourced by transistor 420 and the current sunk by transistor 421 is provided on path 213 (CSA-1). The difference current is a replica (scaled or actual) of the inductor current in the second phase (or more specifically for the portion T-LS2 of the second phase.

Additionally, capacitors 430 and 435 would charge/discharge depending on voltages on path 458 and 459 respectively, and at the end of the second phase (e.g., t54 in FIG. 5) would each have a voltage across them representative of (or corresponding to) the difference current on path 213 at the end of the second phase. In other words, capacitors 430 and 435 enable to store (or hold) the 'information' (in this two voltages) representative of the inductor current at the end of the second phase (e.g., t54). Such 'valley hold' capability of circuit 40 is required since the immediately following first phase, and circuit 41 that estimates the inductor current in the first phase requires this initial condition.

Referring now to FIG. 5, the measured and recreated (and optionally scaled down) inductor current in the second phase is shown in interval t53-t54, and is assumed to be the same at each time point of all cycles 1-6. Cycles 1 through 6 occur sequentially in time, with cycle 1 being the first. That is, cycle2 immediately follows cycle1, cycle3 immediately follows cycle2, etc.

As noted above, the inductor current during the first phases have to be estimated/recreated (at least for small ON durations of HS switch 320). The manner in which such estimation/re-creation is done according to aspects of the present disclosure is described next.

(B) First Phase:

Circuit 41 of current emulator block 350 operates to create a replica of inductor current in the first phases without sensing or measuring the inductor current in the first phases, and is shown containing low-side current-to-voltage (LS-I2V) converter 470A and high-side current-to-voltage (LS-I2V) converter 470B, switches 482 and 484, capacitors 437 and 438, comparator 465, up/down (UP/DN) charge pump driver (CP driver) 460 and charge pump 490. Charge pump 490 is in turn shown containing current source 440 and current sink 445, capacitor 446, NMOS transistor 419 and switch 486. 401 represents a power supply terminal (Vcc), having a voltage of the order of 3V to 5V as an example. In FIG. 5, points 522 represent the peak value of inductor current in each corresponding cycle.

LS-I2V converter 470A receives, on input path 471A, a scaled version of the emulated inductor current Ics (provided on path 213). The scaling factor is noted as 'k', and is typically (but not necessarily) less than 1. LS-I2V converter 470A converts the scaled current input to a corresponding voltage provided as an output.

HS-I2V converter 470B receives, on input path 471B, the scaled version of the emulated inductor current Ics (provided on path 213). The scaling factor is 'k' as for LS-I2V 470A. HS-I2V converter 470B converts the scaled current input to a corresponding voltage provided as an output.

Switch 484 is controlled by control signal en-HS. Control signal en-HS has a logic value that causes switch 484 to be closed for the duration of the first phase (e.g., t51-52 of FIG. 5) or t20-t21 of FIG. 2B, and open otherwise. Switch 482 is controlled by control signal en-LSBLNK. Control signal en-LSBLNK has a logic value that causes switch 482 to be closed for the duration of the blanking interval T-LSBLNK (shown in FIG. 5), and open otherwise.

The operation of switch 482 charges capacitor 438 to a voltage (V-ILS-PK (466)) representing the peak value of the inductor current (points 522 at t53 of FIG. 5). The operation of switch 484 charges capacitor 437 to a voltage (V-IHS-PK 467) representing the value of inductor current at the end of each first phase (t52 in FIG. 5). During each of the T-LS-BLNK intervals in the cycles shown in FIG. 5, the current magnitude into/out of node CSA-1 remains unchanged.

Comparator 465 is coupled to each of paths 466 (+ terminal) and 467 (− terminal), and generates an output on path 468 that is of one polarity (e.g., positive) if V-ILS-PK is greater than V-IHS-PK, and of the opposite polarity (e.g., negative) if V-ILS-PK is lesser than V-IHS-PK. Comparator 465 can be implemented to output 468 of other types also, such as for example logic one and logic zero.

UP/DN CP driver 460 represents a charge pump driver. UP/DN CP driver 460 activates current source 440 if the present output of comparator 465 on path 468 is positive, and activates current sink 445 if the present output of comparator 465 on path 468 is negative. The operation of UP/DN CP driver 460 is such that only one of 440 and 445 is ON in a given time interval. Switch 486 is controlled by signal en-HS, which causes switch 486 to be closed in the first phases (e.g., T-HS of FIG. 5), and open otherwise.

In operation, current emulator block 350 iteratively operates circuit 41 to arrive at the correct inductor current waveform during the first phases, as illustrated by cycles 1-6 (FIG. 5), which may be regarded as the iterations. As may be observed, circuit 41 contains a loop that is iteratively operated until the correct inductor current waveform is obtained. Each first phase starts with the inductor current equal to the valley current at the end of the immediately previous second phase (of the immediately previous cycle) due to the operation of the 'valley hold' mechanism described above.

The goal of the loop formed by circuit 41 is to adjust the current through transistor 419 till the current through transistor 419 and capacitor 430 matches the slope of the inductor current. Current through NMOS 419 is set to 0 initially (first cycle—cycle1 noted below). Comparator 465 and CP driver 460 generate the necessary UP/DN pulses to increase the gate voltage of transistor 419, until the steady-state current through transistor 419 and capacitor 430 matches the slope of the actual inductor current represented by line 510.

The operation of the loop is now illustrated with combined reference to FIGS. 4 and 5.

In the first cycle (cycle1) circuit 41 sets the estimated inductor current waveform (520) to zero by disabling current source 440 and current sink 445. As a result, the voltage across capacitor 446 is zero (or at least not sufficient to switch-ON transistor 419). Hence, NMOS 419 is OFF and does not affect output block 495 since transistor 420 is OFF. Estimated inductor current 520 has a slope of zero, the actual inductor current in the first phase being represented by 510.

In the next iteration, starting at the beginning of cycle2, comparator 465 compares the voltages at nodes 466 and 467, which would respectively correspond to points 522 and 521. Since the voltage on node 466 is greater, comparator 465 generates a signal on path 468 to cause driver 460 to switch ON current source 440 (UP operation) for a small duration (for example, ~5 nano seconds(ns)), thereby charging capacitor 446. Current sink 445 is OFF for this duration. Hence, NMOS 419 is ON and pulls the gate of transistor 420 towards ground to an extent determined by the voltage on capacitor 446. As a result, capacitor 430 charges through switch 486 and current through NMOS 419. Therefore, current through PMOS transistor 420 is increased (as compared with the current in cycle1) since voltage at gate terminal of PMOS 420 progressively reduces. The current through NMOS transistor 421 remains the same as before. Therefore, the difference current at CSA-1 (213) represented by emulated inductor current 530 has a larger slope than in cycle 1. Therefore, the difference between current values at points 522 and 531 is less than that between current values at points 522 and 521.

In the next iteration, starting at the beginning of cycle3, comparator 465 compares the voltages at nodes 466 and 467, which would respectively correspond to points 522 and 531. Since the voltage on node 466 is greater, comparator 465 generates a signal on path 468 to cause driver 460 to switch ON current source 440 (UP operation) for a small duration (for example, ~5 nano seconds(ns)), thereby further charging capacitor 446. Current sink 445 is OFF for this duration. Hence, NMOS 419 is ON and pulls the gate of transistor 420 towards ground to an extent determined by the voltage on capacitor 446 (which is now greater than that in cycle2). As a result, capacitor 430 charges through switch 486 and current through NMOS 419. Therefore, current through PMOS 420 is increased further (as compared with the current in cycle2) since voltage at gate terminal of PMOS 420 progressively reduces further. The current through transistor 421 remains the same as before. Therefore, the difference current at CSA-1 (213) represented by emulated inductor current 540 has a larger slope than in cycle2. Therefore, the difference between current values at points 522 and 541 is less than that between current values at points 522 and 531.

In a manner similar to that described above with respect to cycles 1, 2 and 3, circuit 41 operates to incrementally increase the inductor current in the first phase of each cycle. Thus, inductor currents 550, 560 and 570 are shown respectively having higher slopes. At the start of each of cycles 4, 5 and 6, circuit 41 would compare the voltages/currents represented by points 551, 561 and 571 respectively with that represented by points 522. In FIG. 5, the iteration converges in cycle6 with voltage/current represented by point 571 equalling that represented by point 522. Therefore, 570 represents the correct inductor current (although it may be a scaled version depending on the magnitude of 'k') in the first phase. The scaling factor 'k' is fixed and is known to phase controller 210. Thereafter, the inductor current in the following phases (i.e., after cycle6) will toggle alternately above and below point 571 (also 522) in each cycle based on the charge pump ripple.

It is noted here that if amplifier 450 has a sufficiently high BW, then duration T-LSBLNK could be smaller or zero. In such case, T-LS2 would equal T-LS and switch 482 would be closed for the duration of T-LS. When duration T-LSBLNK equals zero, then circuit 41 would have to be modified appropriately (in place of LS-I2V 470A, switch 482 and capacitor 438) so as to get an estimate of voltage at point 522. Comparator 465 would then operate as described above to compare such voltage with the correspond voltages at t52 (which would now be the same as t53) to drive the rest of the loop as noted above.

Phase controller 210 would operate to process the emulated inductor current waveform provided via node CSA-1 for purposes noted above. The other SPSes of FIG. 2A, as well as their current emulator blocks, would operate in a manner similar to that noted above with respect to SPS 220-1 and current emulator block 350.

6. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2A, 3 and 4, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:
1. A method of emulating an inductor current flowing through an inductor driven by a combination of high-side switch and a low-side switch in a switching converter, wherein the high-side switch and the low-side switch respectively drive the inductor in a first phase and a second phase periodically, the method performed in the switching converter, the method comprising:
measuring a first portion of the inductor current corresponding to a longer phase of the first phase and the second phase, with the other one of the first phase and the second phase being a shorter phase;
estimating a peak of the inductor current at a transition from the shorter phase to the longer phase, wherein the estimating comprises:
(a) comparing an estimated magnitude with a first magnitude of the inductor current at the transition in a first period; and
(b) changing the estimated magnitude and performing (a) and (b) until the estimated magnitude equals the first magnitude to identify the peak;
generating a second portion of the inductor current corresponding to the shorter phase of the inductor current based on the estimated magnitude; and
providing the first portion and the second portion as an emulated current of the inductor current.

2. The method of claim 1, wherein the estimated magnitude is initially set to zero, wherein the first portion and the second portion of the inductor current represent scaled versions of the inductor current in the first phase and the second phase respectively.

3. The method of claim 2, wherein the second phase includes a blanking interval, the magnitude of the emulated current in the blanking interval being constant and equal to the latest magnitude of the estimated magnitude.

4. The method of claim 3, wherein the estimating is performed by a closed loop circuit.

5. A switching converter comprising:
an inductor coupled to a supply voltage node;
a high-side switch and a low-side switch to respectively drive the inductor in a first phase and a second phase periodically; and
a current emulator block to generate an emulated current representing the inductor current through the inductor in each of the first phase and the second phase, wherein the inductor current comprises a first portion in a longer phase of the first phase and the second phase, and a second portion in the shorter phase of the first phase and the second phase,
wherein the current emulator block comprises:
a first circuit to measure the first portion of the inductor current;
a second circuit to iteratively estimate a peak of the inductor current at a transition from the shorter phase to the longer phase, wherein the second circuit is designed to compare an estimated magnitude with a first magnitude of the inductor current at the transition in a first period, wherein the second circuit is designed to change the estimated magnitude for a next period based on a comparison result of the comparison, wherein the second circuit is designed to perform the comparison and changing until the estimated magnitude equals the first magnitude to identify the peak, and
an output block to generate the second portion of the inductor current during the shorter phase of the inductor current based on the estimated magnitude.

6. The switching converter of claim 5, wherein the second circuit comprises:

a comparator to perform the comparisons to generate a comparison result; and
a charge pump coupled to receive the comparison result and to perform the changing based on the comparison result.

7. The switching converter of claim 6, wherein said output block comprises:
a first transistor and a second transistor coupled in series between a first constant reference potential and a second constant reference potential, wherein each of the first portion and the second portion of the inductor current is provided at a current sense output terminal located at the junction of the first transistor and the second transistor, and
wherein, at the start of a first cycle of the iteration, the current sourced by the first transistor and the current sunk by the second transistor is set by the first circuit to cause a difference current representing the valley of the inductor current waveform to be provided at the current sense output terminal,
wherein the second circuit sets the estimated magnitude at the start of the first cycle to zero.

8. The switching converter of claim 7, wherein said second circuit further comprises:
a low-side current-to-voltage converter (LS-I2V) to convert a scaled version of the current at the current sense output terminal to a corresponding first voltage provided at an output terminal of the LS-I2V;
a high-side current-to-voltage converter (HS-I2V) to convert a scaled version of the current at the current sense output terminal to a corresponding second voltage provided at an output terminal of the HS-I2V; and
a first capacitor and a second capacitor, wherein the first capacitor is coupled to the output terminal of the LS-I2V for a duration of a blanking interval of the second phase to charge to the first magnitude in each cycle of the iterations, wherein the second capacitor is coupled to the output terminal of the HS-I2V for a duration of a first phase to charge to the present value of the estimated magnitude in each cycle of the iterations,
wherein said comparator is coupled to each of the output terminal of the LS-I2V and the output terminal of the HS-I2V to compare the present estimated magnitude with said first magnitude in each cycle of the iterations to generate the comparison result.

9. The switching converter of claim 8, wherein the charge pump comprises:
a current source and a current sink;
a third capacitor coupled to a junction of the current source and the current sink;
a third transistor having a control terminal coupled to said third capacitor and a first current terminal coupled to the second constant reference potential; and
a first switch operable to couple a second current terminal of the third transistor to a control terminal of the first transistor corresponding to each first phase to cause the change to the estimated magnitude, and to decouple the second current terminal of the third transistor from the control terminal of the first transistor otherwise.

10. The switching converter of claim 9, further comprising a charge pump driver to receive the comparison result, the charge pump driver to switch ON the current source if the comparison result is of a first polarity, the charge pump driver to switch ON the current sink if the comparison result is of a second polarity.

11. The switching converter of claim 10, wherein the first circuit comprises:
an amplifier to amplify a voltage across the low-side switch in a second phase and to provide an amplified voltage across a pair of terminals;
a fourth capacitor and a fifth capacitor;
a third switch coupled to a first terminal in the pair of terminals, and operable to be closed for a duration corresponding to the interval from the end of a blanking phase of a second phase to the end of the second phase to charge the fourth capacitor; and
a fourth switch coupled to a second terminal in the pair of terminals, and operable to be also closed for a duration corresponding to the interval from the end of a blanking phase of a second phase to the end of the second phase to charge the fifth capacitor.

12. The switching converter of claim 11, wherein a first current terminal of the first transistor is coupled to the first constant reference potential, wherein a second current terminal of the first transistor is coupled to the current sense output terminal, wherein a control terminal of the first transistor is coupled to each of a corresponding terminal of the third switch and the corresponding terminal of the first switch,
wherein a first current terminal of the second transistor is coupled to the second constant reference potential, wherein a second current terminal of the second transistor is coupled to the current sense output terminal, wherein a control terminal of the second transistor is coupled to each of the corresponding terminals of the fourth switch and the corresponding terminal of the first switch,
wherein the fourth capacitor is coupled between the first constant reference potential and the control terminal of the first transistor, and
wherein the fifth capacitor is coupled between the first constant reference potential and the control terminal of the first transistor.

13. A voltage regulator module (VRM) comprising:
a phase controller to generate a regulated supply voltage on a first supply node;
a first inductor coupled to the first supply node; and
a first smart power stage (SPS) comprising:
a high-side switch and a low-side switch to respectively drive the first inductor in a first phase and a second phase periodically; and
a current emulator block to generate an emulated current representing the first inductor current through the first inductor in each of the first phase and the second phase, wherein the first inductor current comprises a first portion in a longer phase of the first phase and the second phase, and a second portion in the shorter phase of the first phase and the second phase,
wherein the current emulator block comprises:
a first circuit to measure the first portion of the first inductor current;
a second circuit to iteratively estimate a peak of the first inductor current at a transition from the shorter phase to the longer phase, wherein the second circuit is designed to compare an estimated magnitude with a first magnitude of the first inductor current at the transition in a first period, wherein the second circuit is designed to change the estimated magnitude for a next period based on a comparison result of the comparison, wherein the second circuit is designed to perform the comparison and changing until the estimated magnitude equals the first magnitude to identify the peak, and
an output block to generate the second portion of the first inductor current during the shorter phase of the first inductor current based on the estimated magnitude.

14. The VRM of claim 13, wherein the second circuit comprises:
a comparator to perform the comparisons to generate a comparison result; and
a charge pump coupled to receive the comparison result and to perform the changing based on the comparison result.

15. The VRM of claim 14, wherein said output block comprises:
a first transistor and a second transistor coupled in series between a first constant reference potential and a second constant reference potential, wherein each of the first portion and the second portion of the first inductor current is provided at a current sense output terminal located at the junction of the first transistor and the second transistor, and
wherein, at the start of a first cycle of the iteration, the current sourced by the first transistor and the current sunk by the second transistor is set by the first circuit to cause a difference current representing the valley of the first inductor current waveform to be provided at the current sense output terminal,
wherein the second circuit sets the estimated magnitude at the start of the first cycle to zero.

16. The VRM of claim 15, wherein said second circuit further comprises:
a low-side current-to-voltage converter (LS-I2V) to convert a scaled version of the current at the current sense output terminal to a corresponding first voltage provided at an output terminal of the LS-I2V;
a high-side current-to-voltage converter (HS-I2V) to convert a scaled version of the current at the current sense output terminal to a corresponding second voltage provided at an output terminal of the HS-I2V; and
a first capacitor and a second capacitor, wherein the first capacitor is coupled to the output terminal of the LS-I2V for a duration of a blanking interval of the second phase to charge to the first magnitude in each cycle of the iterations, wherein the second capacitor is coupled to the output terminal of the HS-I2V for a duration of a first phase to charge to the present value of the estimated magnitude in each cycle of the iterations,
wherein said comparator is coupled to each of the output terminal of the LS-I2V and the output terminal of the HS-I2V to compare the present estimated magnitude with said first magnitude in each cycle of the iterations to generate the comparison result.

17. The VRM of claim 16, wherein the charge pump comprises:
a current source and a current sink;
a third capacitor coupled to a junction of the current source and the current sink;
a third transistor having a control terminal coupled to said third capacitor and a first current terminal coupled to the second constant reference potential; and
a first switch operable to couple a second current terminal of the third transistor to a control terminal of the first transistor corresponding to each first phase to cause the change to the estimated magnitude, and to decouple the second current terminal of the third transistor from the control terminal of the first transistor otherwise.

18. The VRM of claim 17, further comprising a charge pump driver to receive the comparison result, the charge pump driver to switch ON the current source if the comparison result is of a first polarity, the charge pump driver to switch ON the current sink if the comparison result is of a second polarity.

19. The VRM of claim 18, wherein the first circuit comprises:
- an amplifier to amplify a voltage across the low-side switch in a second phase and to provide an amplified voltage across a pair of terminals;
- a fourth capacitor and a fifth capacitor;
  - a third switch coupled to a first terminal in the pair of terminals, and operable to be closed for a duration corresponding to the interval from the end of a blanking phase of a second phase to the end of the second phase to charge the fourth capacitor; and
  - a fourth switch coupled to a second terminal in the pair of terminals, and operable to be also closed for a duration corresponding to the interval from the end of a blanking phase of a second phase to the end of the second phase to charge the fifth capacitor.

20. The VRM of claim 19, further comprising a plurality of inductors and smart power stages, wherein the first inductor is comprised in the plurality of inductors, wherein the first SPS is comprised in the plurality of smart power stages,
- wherein a first current terminal of the first transistor is coupled to the first constant reference potential,
- wherein a second current terminal of the first transistor is coupled to the current sense output terminal, wherein a control terminal of the first transistor is coupled to each of a corresponding terminal of the third switch and the corresponding terminal of the first switch,
- wherein a first current terminal of the second transistor is coupled to the second constant reference potential, wherein a second current terminal of the second transistor is coupled to the current sense output terminal, wherein a control terminal of the second transistor is coupled to each of the corresponding terminals of the fourth switch and the corresponding terminal of the first switch,
- wherein the fourth capacitor is coupled between the first constant reference potential and the control terminal of the first transistor, and
- wherein the fifth capacitor is coupled between the first constant reference potential and the control terminal of the first transistor.

* * * * *